United States Patent [19]
Pieri et al.

[11] Patent Number: 6,124,968
[45] Date of Patent: Sep. 26, 2000

[54] PANORAMIC PERISCOPE

[75] Inventors: Silvano Pieri; Mauro Magnani, both of Florence; Mario Cecchi, Campi Bisenzio, all of Italy

[73] Assignee: Finmeccanica S.p.A., Italy

[21] Appl. No.: 09/180,234

[22] PCT Filed: Apr. 28, 1997

[86] PCT No.: PCT/IT97/00096

§ 371 Date: Oct. 30, 1998

§ 102(e) Date: Oct. 30, 1998

[87] PCT Pub. No.: WO97/42538

PCT Pub. Date: Nov. 13, 1997

[30] Foreign Application Priority Data

| May 3, 1996 | [IT] | Italy | FI96A0093 |
| May 3, 1996 | [IT] | Italy | FI96A0094 |
| May 3, 1996 | [IT] | Italy | FI96A0095 |
| May 3, 1996 | [IT] | Italy | FI96A0096 |

[51] Int. Cl.$^7$ .............................. G02B 23/08; G02B 23/22
[52] U.S. Cl. ........................... 359/405; 359/404; 359/402
[58] Field of Search ..................................... 359/406, 405, 359/403, 402

[56] References Cited

U.S. PATENT DOCUMENTS 4,848,886  7/1989  Pratt ......................................... 359/406

Primary Examiner—Jon Henry
Attorney, Agent, or Firm—McGlew and Tuttle, P.C.

[57] ABSTRACT

A panoramic telescope of the type having a body 3 to be mounted on a vehicle, a head-piece 9 attached to the body and rotating with respect thereto. A window 11 is provided for observing the external scenery. Inside the head-piece is a mirror 13 for deflecting the incoming beam from the window towards an optical detector.

9 Claims, 13 Drawing Sheets

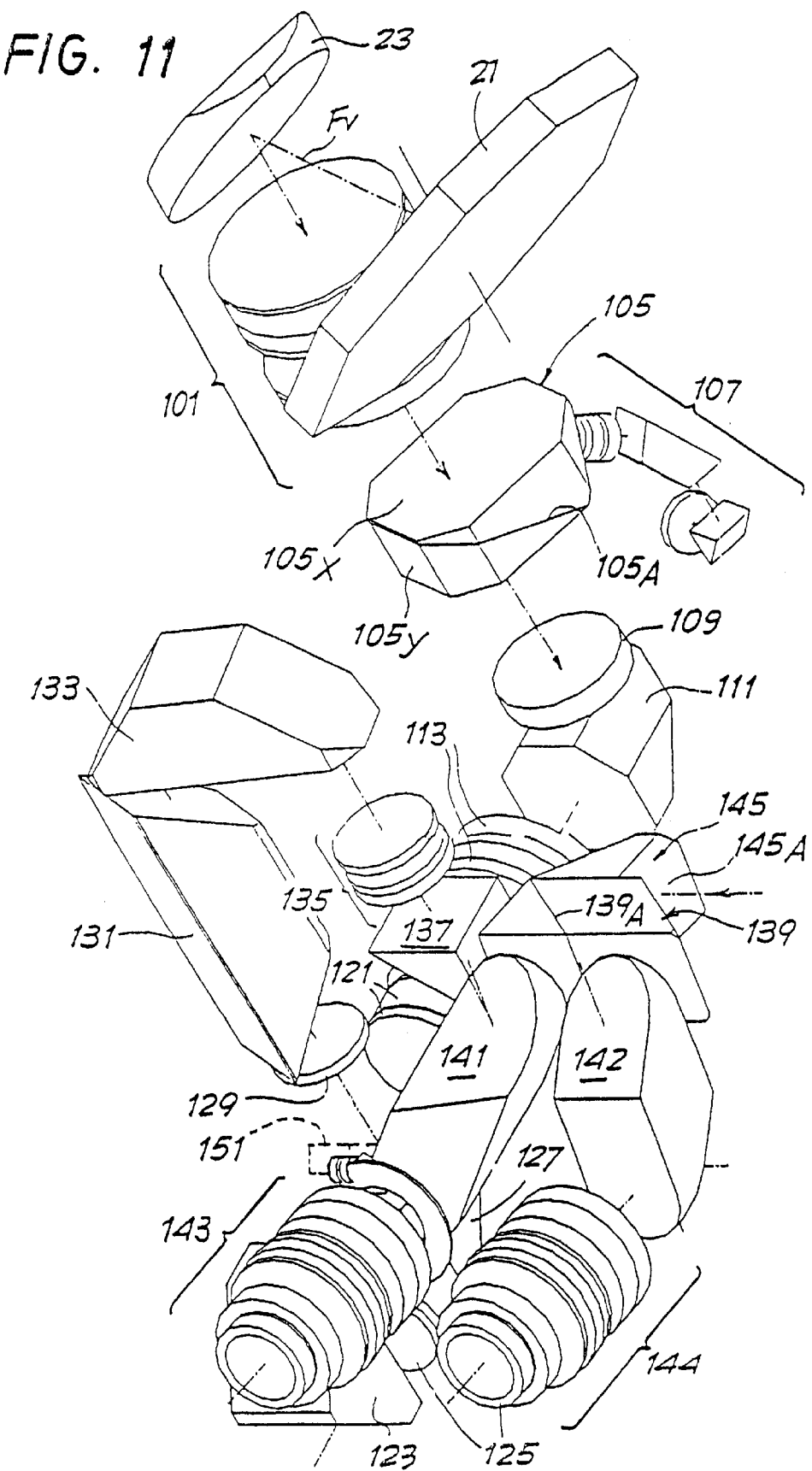

PANORAMIC PERISCOPE

TECHNICAL FIELD

The present invention relates to a panoramic periscope of the type comprising: a body to be mounted on a vehicle; a head-piece attached to said body and rotating with respect thereto and provided with a window for observing the external scenery; inside said headpiece, a mirror for deflecting the incoming beam from said window towards detection means.

Periscopes of this type are commonly used on various types of vehicles, for example on tanks used in armed combat.

BACKGROUND ART

Examples of panoramic periscopes of this type are described in GB-B-1,272,742, U.S. Pat. No. 3,464,757, U.S. Pat. No. 3,200,250, U.S. Pat. No. 3,549,231 and U.S. Pat. No. 4,108,551.

Depending on the type of use and configuration, the periscope may be provided with an optical path in the visible spectrum, or with an infrared optical path with an associated infrared sensor, or with a laser telemeter, or with a combination of these elements.

The space available in the vehicle where the periscope is installed is restricted and this results in the need for a compact structure. Arranging two or three optical paths (visible, infrared and laser) in a panoramic periscope is difficult since it requires a large amount of space.

Moreover, assembly of the various optical components is complex and delicate, since said components must be mounted and aligned with great precision. This is made difficult owing to the fact that the various components frequently have to be assembled and disassembled. It is required, moreover, to reduce the number of optical components in order to simplify the structure and increase the optical efficiency of the apparatus.

The general object of the present invention is to provide a periscope of the type mentioned above which overcomes the drawbacks of conventional periscopes. In particular, the object of the invention is to provide a periscope which is compact even when two or more optical paths are combined in it. It must also be easy and reliable as regards assembly and adjustment of all its components.

In some configurations of the periscope an infrared viewing module with an I.R. sensor is provided. At present, various types of arrangements of the infrared sensor, or so-called heat chamber, exist in panoramic periscopes. In particular, there exist solutions in which the entire heat chamber and the associated optics are arranged inside the central body of the periscope. This allows perfect alignment of the optics during assembly and avoids risks of misalignment. However, this solution has considerable drawbacks since the periscope body assumes notable proportions with consequent problems of installation and limitations as regards the possibility of combining, with the same periscope, an optical path in the visible spectrum.

When the periscope has a heat chamber for night-time viewing in the infrared range, the present invention has the object of providing a periscope in which joining of the heat chamber to the periscope body can be performed in a particularly simple manner and does not give rise to positioning and alignment problems and which, moreover, is particularly compact and easy to install.

In this context, a further particular object of the present invention is to provide a periscope of the type mentioned above, in which the optical elements along the path of the infrared beam are reduced, so that it is possible to have a more powerful signal.

In some periscopes, a laser telemeter is also provided. In this case a separator element inside the periscope body separates the laser path from the optical path in the visible and/or infrared range. A type of periscope currently known has a separator prism with a dichroic surface oriented so as to deviate the visible beam and allow the laser beam to pass through. The deviated visible beam is reflected onto a side surface of the prism and from here is redirected to a facing side surface from where it emerges so as to be directed towards the viewing module. This separator system has large dimensions and occupies a considerable amount of space inside the periscope body.

Within the scope of the general object of the present invention (i.e. of providing a periscope which is particularly compact and has a small number of optical elements), if the periscope has a laser path, a particular object is that of providing a periscope which has an element for separating the laser beam from the visible beam, which has a particularly limited height, so as to reduce the space occupied inside the periscope body and facilitate, where necessary, the arrangement inside the said periscope body of optics for viewing in the infrared range.

In this context, a further object of the present invention is to provide a periscope in which the separator element allows formation of a visible-beam path, which is more favourable from the point of view of the layout of the device.

Normally the rotating head-piece is mounted on the periscope body by means of a system of supports. The volume of the head-piece is delimited at the bottom by a sealed window, which is transparent for a certain radiation range, for example visible radiation and infrared radiation, so as to allow daytime and nighttime viewing. The volume of the central body of the device is in turn closed by a sealed window which is transparent for the same radiation range. Assembly is performed by arranging the two windows facing one another. This therefore results in isolation of the internal volumes of the head-piece and central body from the outside, while the radiation which penetrates into the central body so as to allow viewing directly or via an infrared sensor passes through at least two separation windows.

This has been considered necessary in particular in periscopes with at least two optical paths, because these devices are required to operate in critical environmental conditions and it is necessary to ensure complete isolation, from the outside, of the delicate optical instruments contained in the device. Moreover, the sealing action with respect to the exterior must be ensured so as to prevent escaping of the gas forming the controlled atmosphere inside the device.

However, the presence of two separation windows between the volume of the head-piece and the volume of the body of the device constitutes a serious drawback since it greatly reduces the energy of the beam which reaches the viewing means. This drawback is accentuated in the case of periscopes intended for night-time viewing, since the signal in the infrared range is per se very weak. A loss of signal due to absorption by the two windows constitutes an extremely negative factor in terms of efficiency of the device.

When the periscope must be used for both night-time viewing (by means of infrared images) and daytime viewing (in the visible range) it is necessary to choose a material which is transparent both for radiation in the far infrared range and for visible radiation. The multi-spectral material which can be used in such a wide range of the spectrum reduces the viewing clarity in the visible range, imposing considerable limitations on the overall thickness of the windows.

Moreover, in conventional periscopes, often part of the body of the device is mounted on the vehicle from the inside. If the device is subject to frequent assembly and disassembly operations for reasons of technical maintenance and verification, there is the risk of axial and angular misalignment of the head-piece and body. Such misalignment must be avoided at all costs since, if a sighting grid is provided inside the body of the device, this grid must always be perfectly aligned with the axis of the beam coming from the head-piece. If this condition is not maintained, the device, used for aiming weapons and the like, loses its operational efficiency or the latter is seriously impaired.

In order to avoid these drawbacks, it is necessary to observe very precise tolerances as regards the surfaces for joining together the head-piece and body of the device, with an obvious negative effect in terms of cost.

One particular object of the present invention is to provide a device which allows the signal losses to be reduced, in particular in the far infrared range.

One further particular object of the present invention is to provide a device which eliminates the need for disassembling the head-piece from the body and which therefore eliminates the risk of misalignment between the optics contained in the body and the optics contained in the head-piece, and in particular the misalignment between the sighting grid and the optics of the rotating panoramic head-piece.

A further object of a particular embodiment of the present invention is to provide a device which does not require excessively small machining tolerances as regards the surfaces for joining together the head-piece and body of the device.

Yet another object of an embodiment is that of obtaining a high degree of integration between the components and functions, so as to assemble everything within the space contained in a cylinder and allow assembly of the device from above.

In periscopes of the type currently known, which are provided with an optical path in the visible spectrum for daytime viewing, complex systems for varying the magnification ratio are used. These systems comprise an arrangement of movable optics which change condition depending on the magnification ratio required.

The known devices are costly and delicate, as well as being bulky, a feature which is a particularly unfavourable aspect when the periscope must be installed on vehicles where there are problems of space and robustness, as in the case of tanks used in armed combat.

When the periscope is provided with an optical path in the visible spectrum, a particular object of the present invention is to provide a periscope having a system for changing the magnification ratio which is simpler, more reliable and less bulky than conventional systems.

SUMMARY OF THE INVENTION

According to the invention, in order to obtain the advantages and the objects of improved I.R. viewing, the infrared module is joined to the central body in the region of an interface where the infrared beam is collimated. Advantageously it is also possible to envisage that the optics for focussing the infrared beam may comprise a lens defining an exit window of the central body and a lens defining an entry window of the infrared module, for passage of the infrared beam.

In this way the infrared module may be easily disassembled from the periscope body and re-assembled thereon without problems of alignment of the optics contained in the module and in the body respectively, since the collimated beam is insensitive to misalignment of the optical axes, provided that the parallelism of the axes themselves is ensured. This parallelism may be easily obtained by providing two flat reference surfaces, on the module and on the central body of the periscope, respectively. Moreover, if the exit windows of the central body of the periscope and entry windows of the infrared module are defined by lenticular elements of the focussing optics, a further series of advantages is obtained. Firstly, since the lenses constitute at the same time elements for closing and isolating the internal volumes of the central body and the infrared module from the outside, it is possible to avoid inserting into the optical path of the infrared beam further window elements which cause signal loss. This also results in a reduction in the size of the periscope. Moreover, with this configuration at least one lenticular element is present in the central body of the periscope and this makes it possible to align, during assembly, the axis of the incoming beam with the axis of the optics, without the need for introducing auxiliary optical elements for correction of the angle, which would cause loss of energy in the signal.

Moreover, by arranging part of the optics in the central body, while keeping a beam collimated at the interface between central body and infrared module, in the region of this interface there is a section of the beam which is smaller than the section of the incoming beam. This makes it possible to collect in the infrared module all the available energy with a relatively small opening.

According to a particularly advantageous embodiment of the invention, the lens defining the exit window of the central body is mounted on a support, the position of which with respect to the central body is adjustable in a plane perpendicular to the optical axis of the lens itself. This allows easy alignment of the optics during assembly of the device. A similar solution may be adopted for the lens defining the window for entry of the beam into the infrared module.

The focussing optics group housed in the central body of the periscope may consist of a Galilean telescope, the eyepiece of which forms the closing lens of the exit window of the central body. The optics housed in the central body may comprise, moreover, an intermediate optical group movable along the axis of the focussing optics, for modifying the magnification ratio. The intermediate optical group may have associated with it a diaphragm which alternately assumes a displaced position with respect to the optical path, or an active position, in which the diaphragm is positioned along the optical path. In the active position, the diaphragm is positioned between said intermediate optical group and the exit window of the central body.

According to a possible embodiment, the diaphragm is hinged on an axis perpendicular to the optical axis and is biased by a resilient member into its displaced position. The intermediate optical group and said diaphragm have mutually engaging means which cause oscillation of the diaphragm towards its active position when the intermediate optical group performs a translatory movement along the optical axis towards its position furthest from the exit window of the central body, i.e. towards its position adjacent to the objective of the telescope.

Advantageously, the mutually engaging means may comprise a hook integral with the diaphragm, oscillating about the oscillation axis of the diaphragm itself, while the intermediate optical group has a pin which engages in said hook. The shape of the hook and the pin are such that the diaphragm is stabilized in its active position when the intermediate optical group is located approximately in its upper position.

According to a possible embodiment, the infrared module has housed inside it a de-rotator comprising a Pechan prism.

When the periscope has a laser telemeter with a separator element, in order to reduce the space occupied and hence allow integration of the various components, it is envisaged that the separator element may have an entry surface and an exit surface parallel with one another and passed through by said visible optical beam;

that the entry and exit surfaces are perpendicular to the visible optical beam; and that the inner dichroic surface is orientated, with respect to the entry surface, so that the laser beam is reflected by the dichroic surface towards the entry surface at an angle such as to be reflected entirely by said entry surface towards a surface for lateral exiting of the laser beam.

A dichroic element of extremely limited thickness is thus obtained, said element being such as to allow assembly in a periscope of small dimensions, or in a restricted zone of a periscope which has, for example, in addition to an optical path in the visible spectrum, also an infrared optical path, while maintaining limited dimensions of the periscope body, for easy installation. The visible beam does not undergo deviations by the separator element and this allows easier housing of the optics downstream of the separator element.

In order to facilitate formation of the dichroic surface, it is possible to envisage an angle of incidence of the radiation on the dichroic surface which is much smaller than that of conventional devices, for example of the order of 30°.

In order to reduce the signal losses and facilitate assembly of the head-piece and body of the periscope, when there are at least two optical paths, the headpiece and the entire central body may be stably joined together with the intervening arrangement of a seal which isolates the inside of said head-piece and said body from the outside, allowing mutual rotation.

In this way, the two elements (head-piece and body) may be laboratory-assembled, ensuring once and for all correct alignment of the optical axis of the head-piece and optical elements, in particular the sighting grid, in the periscope body. Assembly and disassembly of the periscope onto and from the vehicle do not require detachment of the head-piece from the body. With the intervening arrangement of a suitable system of gaskets between the head-piece and the body it is possible to eliminate the windows closing off the internal volumes of the head-piece and body, thus eliminating two elements normally present in conventional devices and the cause of a reduction in the signal and hence the efficiency of the periscope, with advantages in particular for night-time infrared viewing, even if there still exists the possibility of retaining only one of these windows, which in this case will have only a mechanical protective, but not a sealing function.

The sealing action may be advantageously obtained by means of the use of a pair of flat and geometrically opposing gaskets, the first of which being designed to ensure sealing from the outside towards the inside and the second of which being designed to ensure sealing from the inside towards the outside. In a practical embodiment, gaskets with a V-shaped section orientated in opposite directions may be used.

In a possible embodiment, the central body of the periscope has associated with it a viewing module containing means for focussing the beam of visible radiation coming from the panoramic head-piece and at least one eyepiece for observing the external scenery; the viewing module may be separated from the central body in order to facilitate assembly and disassembly of the periscope with respect to the vehicle. In this case the central body and the viewing module have, respectively, an exit window and an entry window for the beam coming from the panoramic head-piece of the periscope. Joining together of the two units (central body and viewing module) may be performed advantageously along flat reference surfaces, perpendicular to the optical axes of the optical elements contained in the units themselves. If, from the last element along the optical path inside the central body, the beam emerges collimated, with this system it is possible to reduce to a minimum the problems of optically joining together the central body and viewing module. In fact, in this case, the system becomes insensitive to any misalignment of the optical axes of the central body and the viewing module, provided that the parallelism thereof is ensured. Said parallelism can be easily obtained with correct and accurate machining of the two flat joining surfaces, which may have a considerable extension in order to ensure the necessary precision.

If the periscope has an optical path in the visible spectrum with a system for changing the magnification ratio, a reduction in the overall dimensions and a greater reliability are obtained with a device in which the means for varying the magnification ratio comprise a movable element carrying an optics group and a reflecting mirror, said movable element being displaceable between two alternative positions: in the first of said positions the reflecting mirror deviates the beam entering the viewing module towards an optical path terminating in the eyepiece or in the pair of eyepieces of the viewing module, whereas the optics carried by the movable element are displaced with respect to the path of the beam; in the second of said positions the reflecting mirror is displaced with respect to the path of the beam and said optics are inserted in the path itself, such that the incoming beam passes through said optics and a series of fixed auxiliary optical elements defining an alternative optical path to the reflecting mirror.

In a practical embodiment, the fixed auxiliary optical elements comprise a convergent lenticular element arranged between two deviating prisms. With this arrangement it is possible to obtain an optical path which forms a quadrilateral, the first side of which defines the entry direction and the second side defines the exit direction of the beam from said alternative optical path, said two entry and exit directions coinciding with the directions of incidence and reflection of the beam on the reflecting mirror, when said reflecting mirror is located in the optical path of the beam.

With the arrangement according to the invention the change in the magnification ratio is obtained with a brief displacement of the movable element carrying the reflecting mirror and the movable optics, while the remaining optics are fixed. This simplifies considerably the structure of the viewing module, allows a reduction in the dimensions thereof and increases the reliability thereof.

So as to allow easy joining together of the viewing module to the central body of the periscope, without the need for imposing a relative coaxial arrangement of the optics present in the body and the optics present in the module, according to a preferred embodiment, the beam incident on the reflecting mirror or entering the movable optics may be a collimated beam.

Further advantageous features of the device according to the invention are indicated in the accompanying claims and described below with reference to an example of embodiment.

The individual contrivances, improvements and innovations summarised above and described in greater detail below may be adopted individually or in various combinations with one another. In particular, the configuration of the I.R. path, the dichroic prism, the mechanism for assembly of the head-piece and body, as well as the means for changing the magnification ratio, may be used independently of one another.

BRIEF DESCRIPTION OF THE DRAWINGS

The invention will now be more clearly understood with reference to the description and accompanying drawing, which shows a practical non-limiting example of the invention itself. In the drawing:

FIGS. 10 and 11 show two axonometric views, at two different angles, of the optical elements along the path of the visible beam;

DETAILED DESCRIPTION OF THE INVENTION

Figure 1:
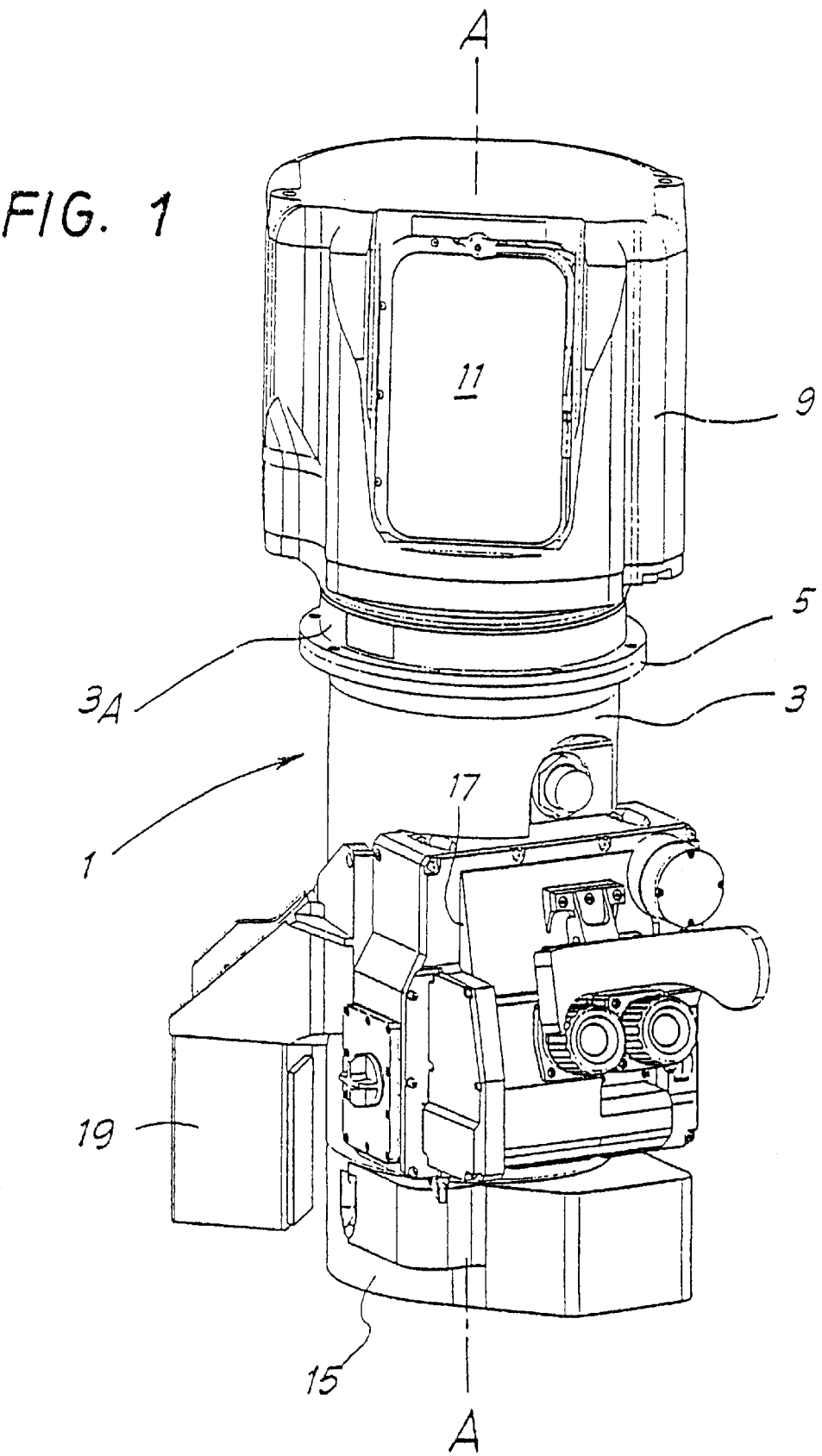
FIG. 1 shows an external axonometric view of the device.
Figure 2:
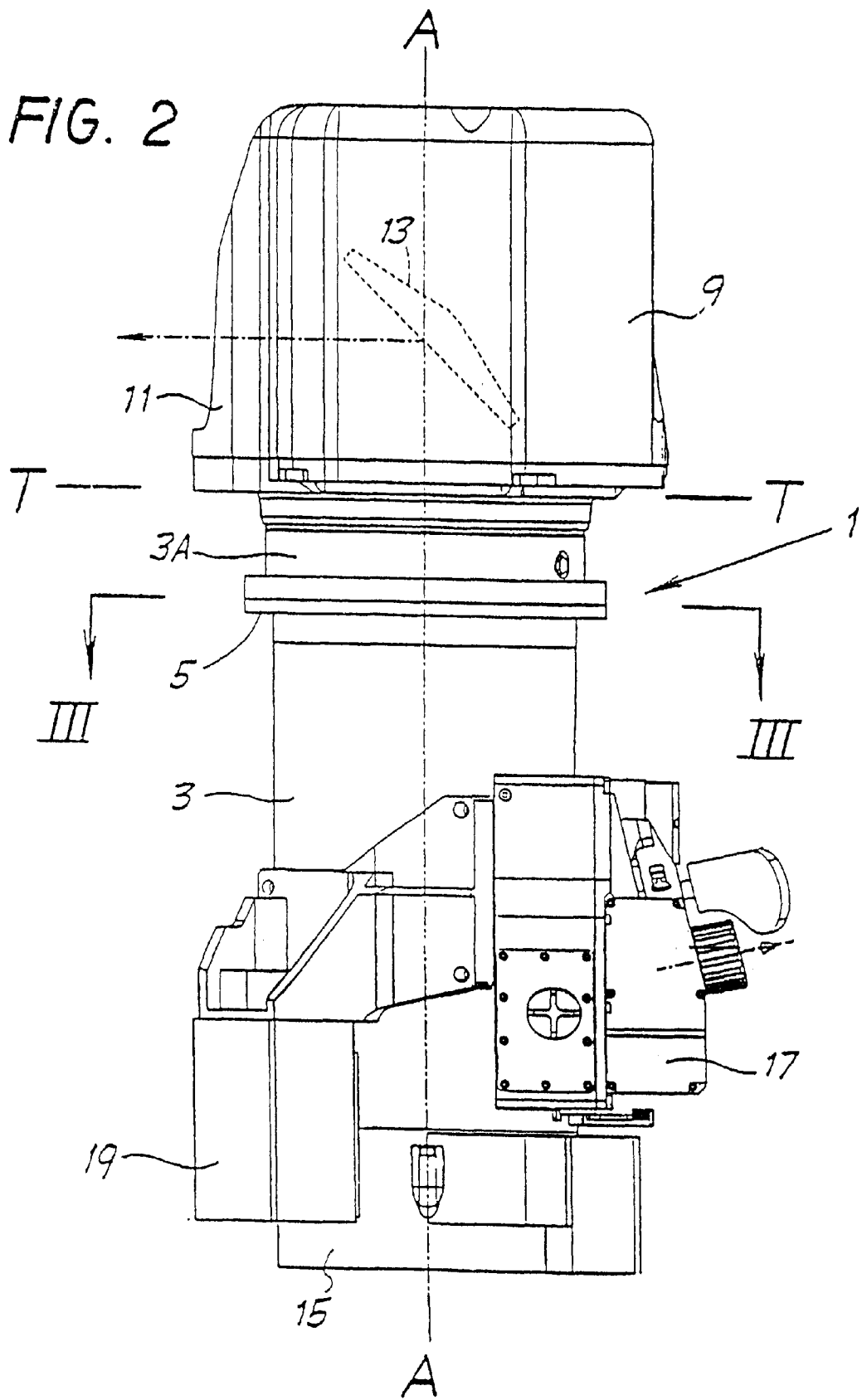
FIG. 2 shows a side view of the device.

The device, generally denoted by 1, is shown in its entirety in FIGS. 1 and 2. It has a central body 3 with a flange 5 by means of which the body 3 is mounted on the vehicle (not shown). T—T indicates the path of the joining and reference plane for the periscope and vehicle. The flange 5 has stably connected to it an intermediate element 3A supporting a panoramic headpiece 9 rotating with respect to the body 3 about a vertical axis A—A. As will be clarified below, the body 3, with the intermediate element 3A, and the rotating head-piece 9 are connected to each other stably so that the device 1 may be assembled on and disassembled from the vehicle without the need for separating the head-piece 9 and the body 3,3A from one another.

The rotating head-piece 9 has a window 11 for allowing the laser beam of a telemeter and radiation beams in the visible and far infrared range to pass through, for daytime and night-time viewing. The rotating head-piece 9 has inside it a stabilized mirror 13 (FIG. 2) which is able to perform a traversing and raising movement and which receives the light beams from the outside through the window 11 and deviates them towards the inside of the body 3 of the device, where the various optics, described below in detail, are arranged. The head-piece 9 is free to rotate about Nx360° so as to be able to explore the entire surrounding horizon. The mirror 13 is mounted so as to be able to rotate about two mutually perpendicular axes, one of which is parallel to the axis A—A of rotation of the head-piece 9. The two combined movements, i.e. of the head-piece 9 and the mirror 13 arranged inside it, allow the line of sight to be orientated in every direction, independently of the movements of the vehicle on which the device 1 is mounted.

The body 3 has fitted to it three main modules: a first module 15 for viewing in the infrared range, referred to below as I.R. module, containing a heat chamber for viewing in the far infrared range; a second module 17, referred to below as viewing module, for daytime viewing in the visible radiation range; a third module 19, referred to as laser module, containing a laser telemeter, which will not be described in detail, being known per se.

The beam of rays which enters through the window 11 and is reflected by the window 13 towards the axis of the body 3 and inside the body 3 is divided up into three beams: visible radiation, infrared (I.R.) radiation and laser radiation (forming the outgoing and return laser beam of the telemeter). The three beams, i.e. infrared beam, visible beam and laser beam, follow the same path in the panoramic head-piece and in a first section of the body 3, and are then divided by means of optical band-separating elements (dichroic mirrors) which generate different paths, all contained in the body 3, so as to reach the three modules 15, 17 and 19. Below, firstly the path of the infrared beam and, secondly, the path of the laser beam and visible beam are described.

Figure 3:
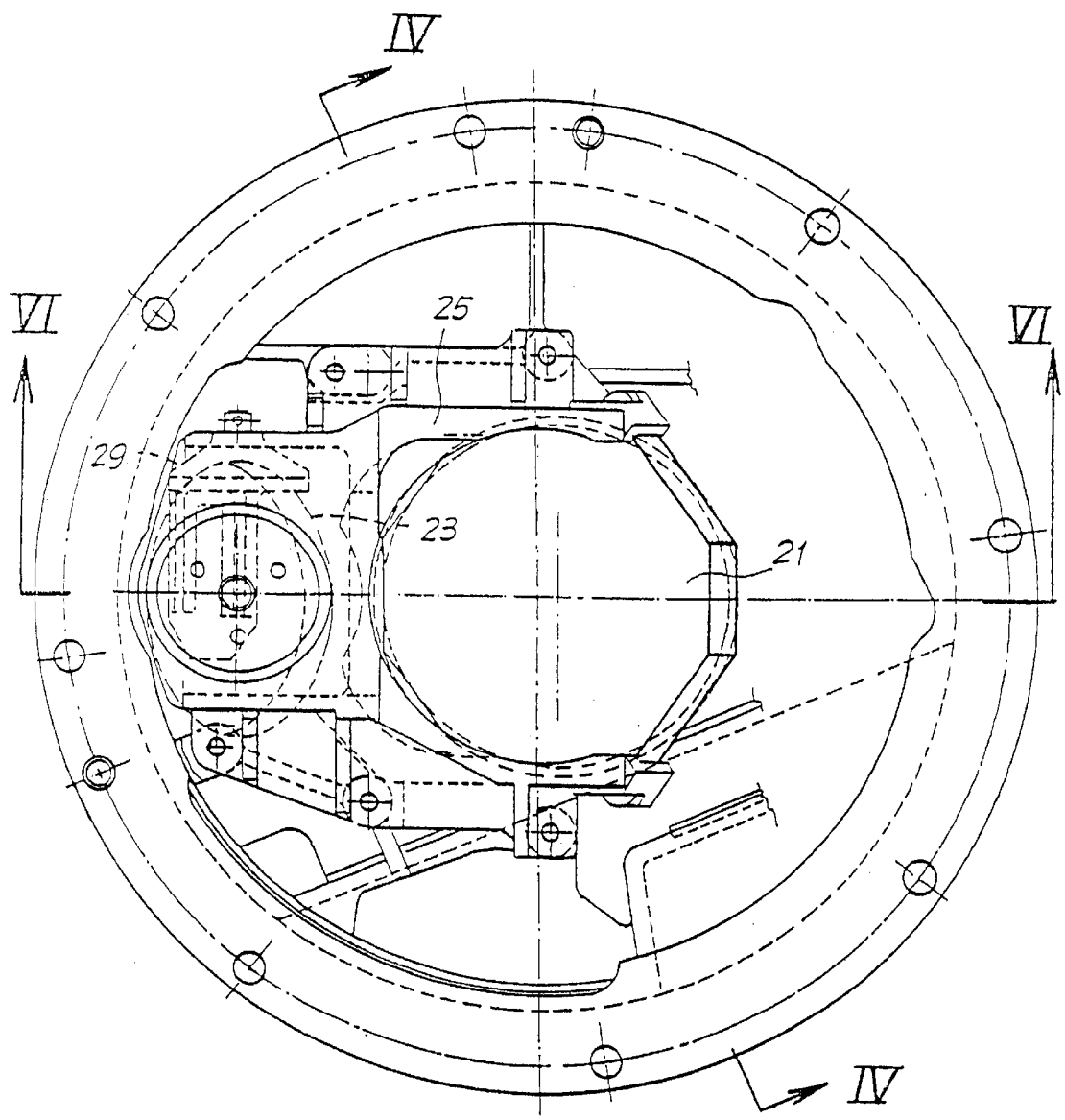
FIG. 3 shows a local section, along III—III of FIG. 2, through the body of the device, with the head-piece removed.

FIG. 3 shows a local section along a plane III—III perpendicular to the axis A—A of the device 3 and coinciding with the upper surface of the flange 5. Said section shows a first dichroic mirror 21 which is inclined at 45° with respect to the horizontal and which reflects the laser beam and the visible radiation towards a reflecting mirror 23, also oriented at 45°, which directs the laser beam and the visible beam towards a path located laterally with respect to the median axis of the body 3 and which will be described below.

Figure 6:
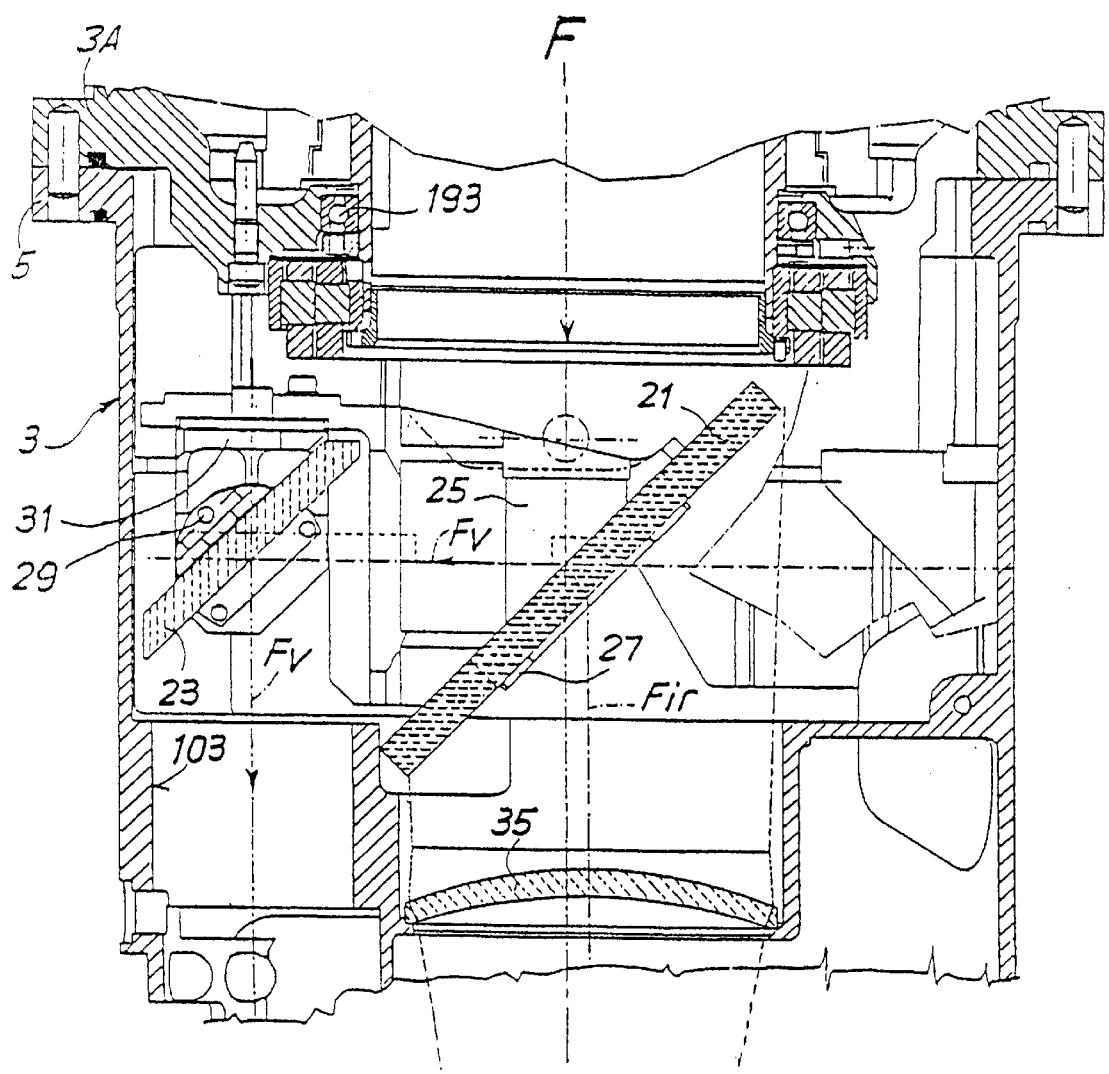
FIG. 6 shows a local section through the first two mirrors of the optical path, along an axial plane perpendicular to the plane of the mirrors themselves.

The dichroic mirror 21 is transparent for infrared radiation such that the infrared beam passes through the dichroic mirror 21 itself, with a slight deviation due to the passage through the two air/mirror and mirror/air interfaces. In FIG. 6, F denotes the axis of the beam reflected by the rotating mirror, $F_{ir}$ the axis of the infrared beam which emerges from the dichroic mirror 21 and $F_v$ the axis of the visible beam and the laser beam reflected by the dichroic mirror 21 and by the mirror 23.

The two mirrors 21, 23 are mounted on a support 25 which is clearly visible in various views shown in FIGS. 3, 4, 5 and 6. In particular the dichroic mirror 21 is fixed on the support 25 by means of two side brackets 27. The mirror 23 is mounted on a frame-piece 29 in turn supported on an intermediate element 31 mounted on the support 25. The intermediate element 31 may be oriented about a vertical axis, while the frame-piece 29 may be oriented about a horizontal axis. This allows adjustment of the position of the reflecting mirror 23 on the support 25 with respect to the dichroic mirror 21, for correct alignment of the optical axes.

Figure 4:
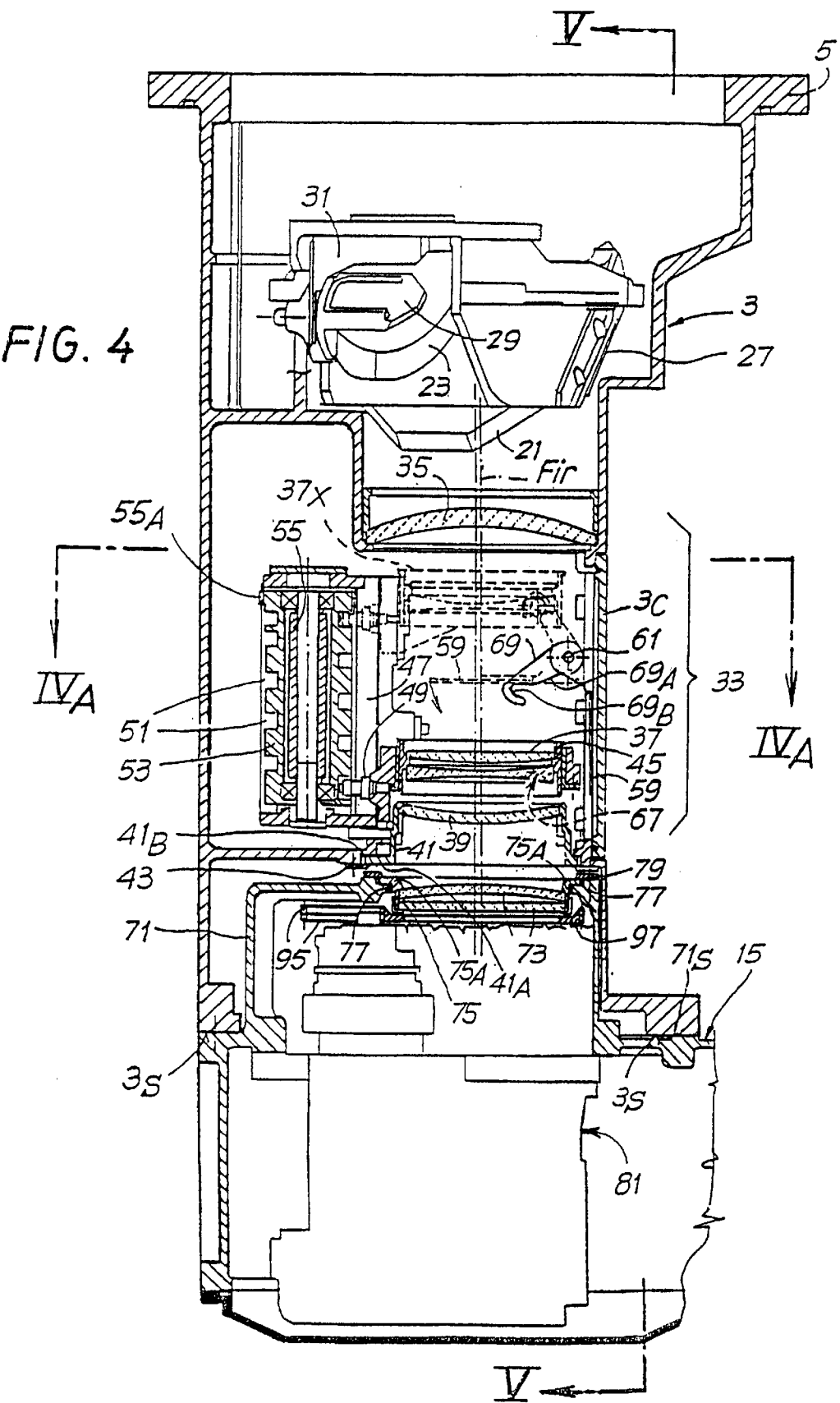
FIG. 4 shows a section along several parallel vertical planes, along the guide lines IV—IV of FIG. 3.
Figure 5:
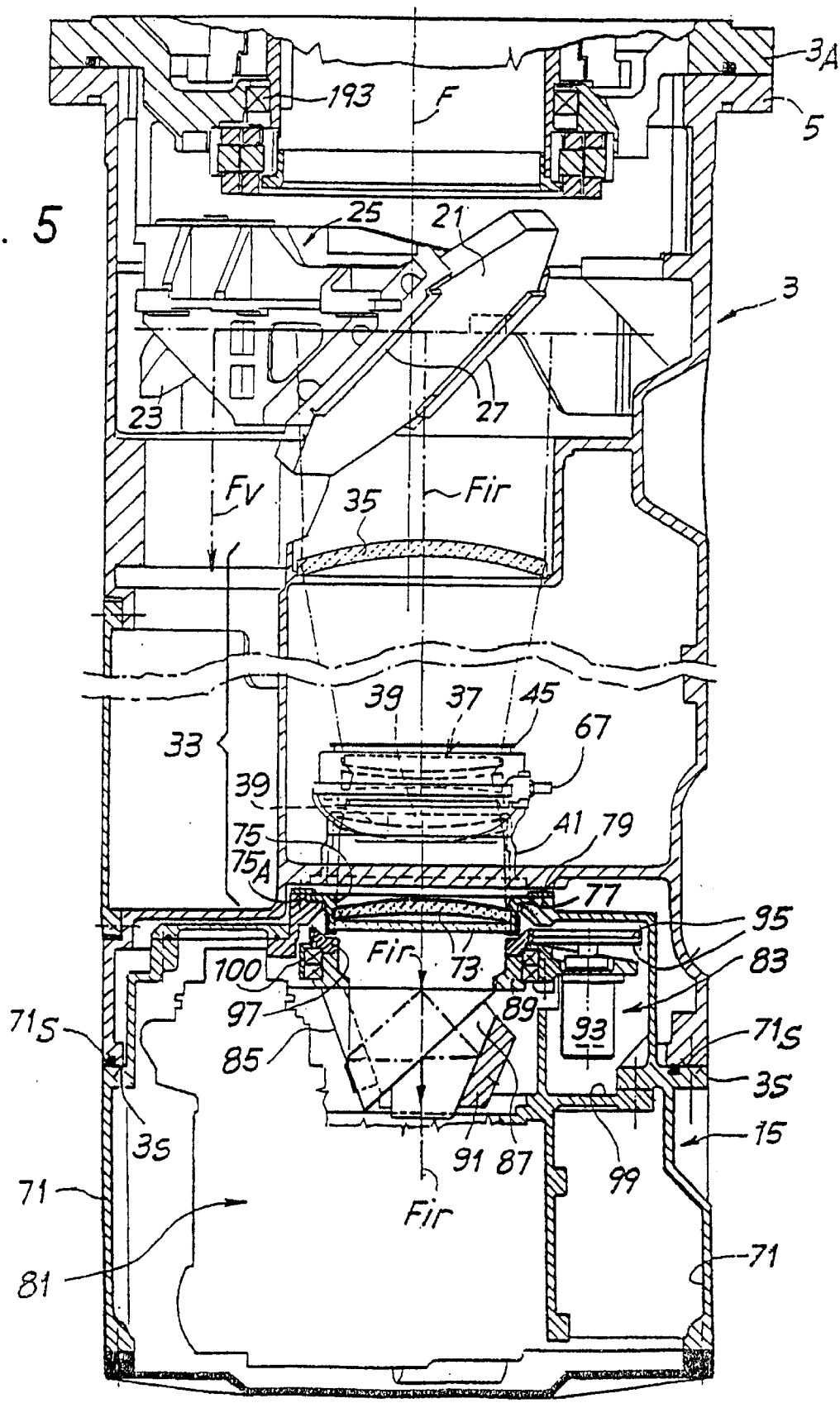
FIG. 5 shows a further section along a vertical plane indicatively along the line V—V of FIG. 4.

The beam $F_{ir}$ which passes through the dichroic mirror 21 is focussed by a first group of optics which are housed in the body 3 and form a Galilean type telescope denoted in its entirety by 33 (FIGS. 4 and 5). The telescope 33 has an entry lens 35 (telescope objective), a set of intermediate optics 37 and an exit lens 39 (telescope eyepiece). The exit lens 39 is mounted on a collar 41 equipped with a flange 41A housed in a seat 41B formed in the body 3 and fixed there by means of a locking ring 43. The diameter of the flange 41A is slightly smaller than the diameter of the seat 41B so as to allow adjustment of the position of the collar 41 and hence align the optical axis of the telescope 33 so that it is perpendicular to the plane of assembly 3S of the infrared module 15. The lens 39 and the associated collar 41 form the bottom closing window of the periscope body 3.

The beam leaving the lens 39 is a collimated beam, for the purposes which will be described below.

Figure 4A:
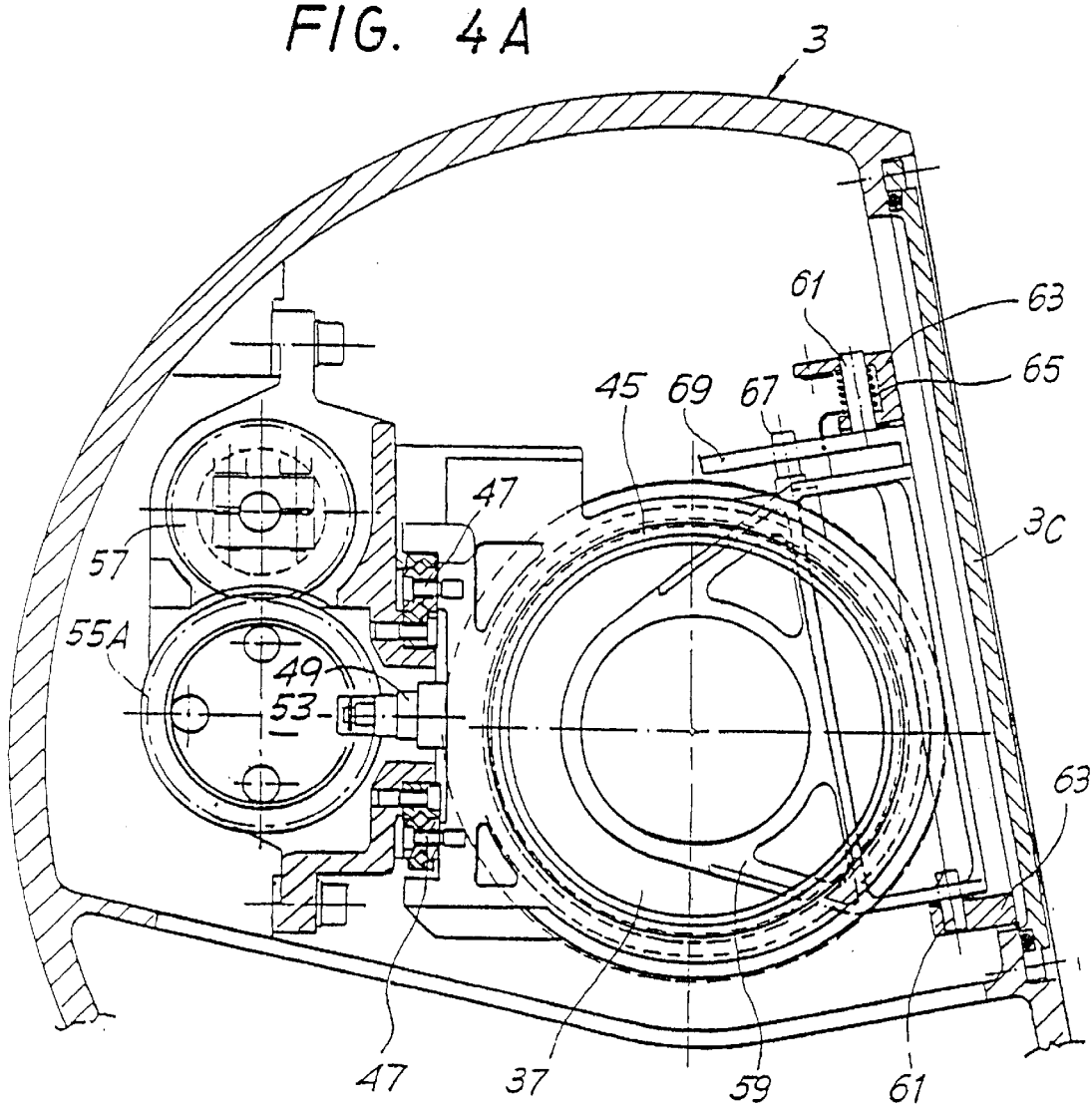
FIG. 4A shows a local section along IVA—IVA of FIG. 4.

The intermediate optics 37 is mounted on a ring 45 guided in two guides 47 parallel to the axis $F_{ir}$ of the I.R. beam and has a lug 49 which engages in a helical groove 51 of a screw 53 supported on a shaft 55. At one of its ends the screw 55 has a crown gear 55A which meshes with a toothed wheel 57 (cf. FIG. 4A) made to rotate by a motor (not shown in the Figure). Rotation of the screw 53 causes displacement of the ring 45 and the associated intermediate optics 37 from the position shown in continuous lines in FIG. 4 to the position shown in broken lines in the same figure and denoted by 37X. The two positions shown in FIG. 4 correspond to two different magnification ratios of the infrared image focussed by the telescope 33. When the intermediate optics 37 is located in the position 37X, a diaphragm 59 must be inserted between said optics and the exit lens 39. Said diaphragm is hinged, by means of two pivots 61, with two brackets 63 integral with the body 3 of the device and is normally kept in a displaced position with respect to the path of the infrared beam by means of a helical spring 65 (FIG. 4A) arranged coaxially with one of the pivots 63. In order to allow raising of the .diaphragm and positioning thereof in the path of the infrared beam, the ring 45 is provided with a pin which, when the group 37 is raised from the bottom position towards the upper position 37X, engages with a hook 69 integral with the diaphragm 59 and oscillating about the axis of the pivots 61. As can be clearly seen from FIG. 4, during the upward movement of the ring 45, the pin 67 firstly enters into contact with the surface 69A of the hook 69; continuing along the raising path, the ring 69 rotates about the axis of the pivots 61 until the pin 67 engages in the groove 69B of the hook 69 when the ring 45 reaches its maximum raised position (shown in broken lines in FIG. 4). The geometrical shape of the hook 69 and the pin 67 is such that the diaphragm 59 is securely locked in this position such that it is unable to perform any oscillating movement wih respect to the horizontal position.

When the ring 45 is brought back into the lower position, the helical spring 65 causes retraction of the diaphragm 59.

The intermediate optics 37 and the members on which it is mounted, as well as the devices for changing the magnification ratio, which cause displacement thereof along the axis, are mounted in the body 3 by means of a special opening which is then closed by a cover 3C.

The I.R. module 15 is housed inside a body 71 which has a flat reference surface 71S for joining with the central body 3 of the device. The flat surface 71S is joined together with the flat surface 3S of the body 3. The machining of the surfaces 3S and 71S ensures correct mutual angular positioning of the central body 3 and the body 71 of the I.R. module 15. Since, as indicated above, the beam leaving telescope 33 is a collimated beam, during joining together of the I.R. module 15 and the central body 3, it is not necessary to ensure coaxial alignment.

The body 71 of the I.R. module 15 is closed at the top by an entry window consisting of an entry optics group 73 (objective of the I.R. chamber) mounted on a collar 75 with a flange 75A. The flange 75A is housed in a seat 77 of the body 71 of the I.R. module 15 and has an external diameter smaller than the diameter of the seat 77, so as to allow adjustment of the position of the optics 73 and hence alignment of the optical axis thereof so that it is perpendicular to the plane 71S for assembly on the body 3. The collar 75 is fixed in position by means of a locking ring 79.

The two mutual adjustments of the telescope 33 on the plane 3S and of the module 15 on the plane 71S allow perfect interchangeability of the modules 15 and rapid assembly and disassembly thereof.

The entry optics 73 form, together with the telescope 33 housed in the central body 3, the optics for focussing the infrared beam associated with the unit for conversion of the infrared image, generally denoted by 81, which is housed in the I.R. module and called a "re-imager". The conversion unit 81 may consist of a heat chamber of a type known per se and not described in greater detail here, or may consist of a sensor of the type described in Italian Patent Application No. FI96A59 filed on Mar. 25, 1996 in the name of the same Applicant.

As shown in particular in the cross-section of FIG. 5, a de-rotator device, generally denoted by 83, is arranged in the I.R. module 15, between the entry optics or objective 73 and the sensor 81. It comprises a so-called "Pechan prism" which consists, in reality, of two prisms 85, 87 held by a support 89 and by two brackets 90 and 91. The path of the infrared beam in the prisms 85, 87 is indicated in dot-dash lines in FIG. 5: it is reflected five times before emerging from the horizontal face of the prism 87 and being directed towards the re-imager 81. As is known, rotation of the Pechan prism 85, 87 through a certain angle about its vertical optical axis causes a dual rotation of the image about the same axis. Rotation of the support 89 and hence of the Pechan prism has the function, in the device in question, of compensating for rotation of the panoramic head-piece 9 and the mirror 13 and hence ensuring that the image is viewed always with a suitable orientation.

Rotation of the support 89 is obtained by means of a de-rotator motor 93 which drives a double toothed wheel 95 meshing with a crown gear 97 integral with the support 89. The toothed wheel 95 is double and the two parts are elastically biased so as to rotate angularly with respect to one another for recovery of the play on the meshing teeth. The de-rotator motor 93 is mounted on a support block 99 fixed to the body 71 of the I.R. module 15. The support block 99 also supports the rotating support 89 on which the Pechan prism 85, 87 is mounted by means of the intervening arrangement of a pair of bearings 100. The re-imager 81 is also fixed onto the support block 99, as indicated in FIG. 5. The de-rotator motor 93 causes the Pechan prism 85, 87 to perform a rotation equivalent to half the rotation performed by the rotating head-piece 9, such that the infrared image retains a fixed orientation upon entry into the re-imager 81.

As can be clearly seen from FIGS. 3 and 6, the laser beam and the rays in the visible range, which are reflected by the dichroic mirror 21 and by the reflecting mirror 23, are directed downwards inside the body 3 along a path lateral and parallel to the path of the infrared beam described here. Below, the path of the laser rays and the visible rays will be described with reference in particular to the axonometric views shown in FIGS. 10 and 11. The reflecting mirror 23 has arranged below it an objective 101 mounted in a seat 103 (see FIGS. 6 and 7) in the body 3 of the periscope. The beam reflected by the mirror 23 is focussed by the objective 101 and sent to a separator element 105 with an inner .dichroic surface 105A which has the function of separating the laser beam from the visible rays. The laser beam is reflected by the dichroic surface 105A towards a re-collimation optical group 107. This group, together with the objective 101, forms a telescope referred to as a "laser beam expander". The beam thus re-collimated is then sent via the window 107A to the laser module 19, not described and known per se.

Figure 11A:
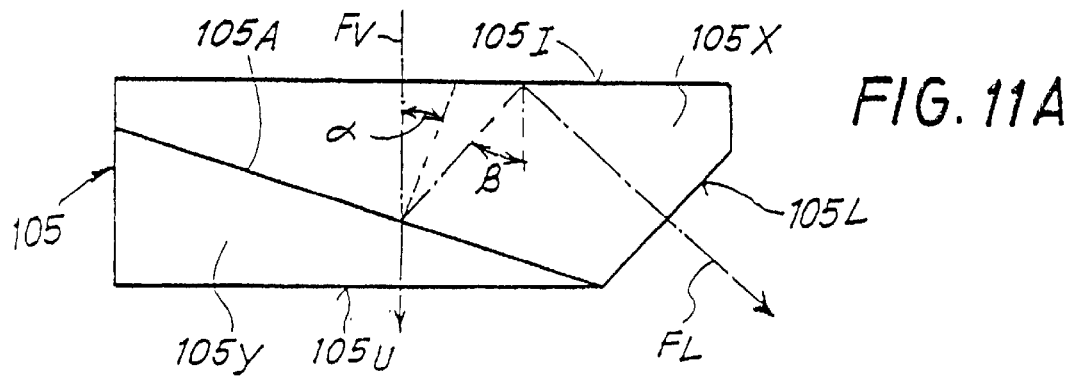
FIG. 11A shows a schematic side view, on a larger scale, of a separator element which separates the visible beam from a laser beam which is directed to a telemeter associated with the periscope.

The separator element 105 is shown isolated and in detail in the diagrammatic side view of FIG. 11A.

It consists of a pair of prisms 105X, 105Y joined together at the dichroic surface 105A. The prism 105X has an entry surface 105I perpendicular to the beam $F_v$. The beam $F_v$ passes through the entry surface 105I and meets the dichroic surface 105A. The latter is orientated so that the angle of incidence α is small, typically in the order of 30°. The dichroic treatment of the surface 105A is such as to allow through the visible radiation which continues its path until it emerges (without being deviated with respect to the entry direction $F_v$) from an exit surface 105U formed on the prism 105Y and still perpendicular to the direction of the beam $F_v$. Viceversa, the laser beam is reflected by the dichroic surface 105A back towards the entry surface 105I. The angle of incidence β of the laser beam F1 on the surface 105I is such as to cause total reflection of the laser beam itself which is thus deviated towards an exit surface 105L formed on the prism 105X and perpendicular to the direction of the laser beam reflected by the surface 105I.

The separator element 105 thus formed has dimensions heightwise which are extremely small and much less than the conventional separator prisms used in periscopes of the known type.

Figure 7:
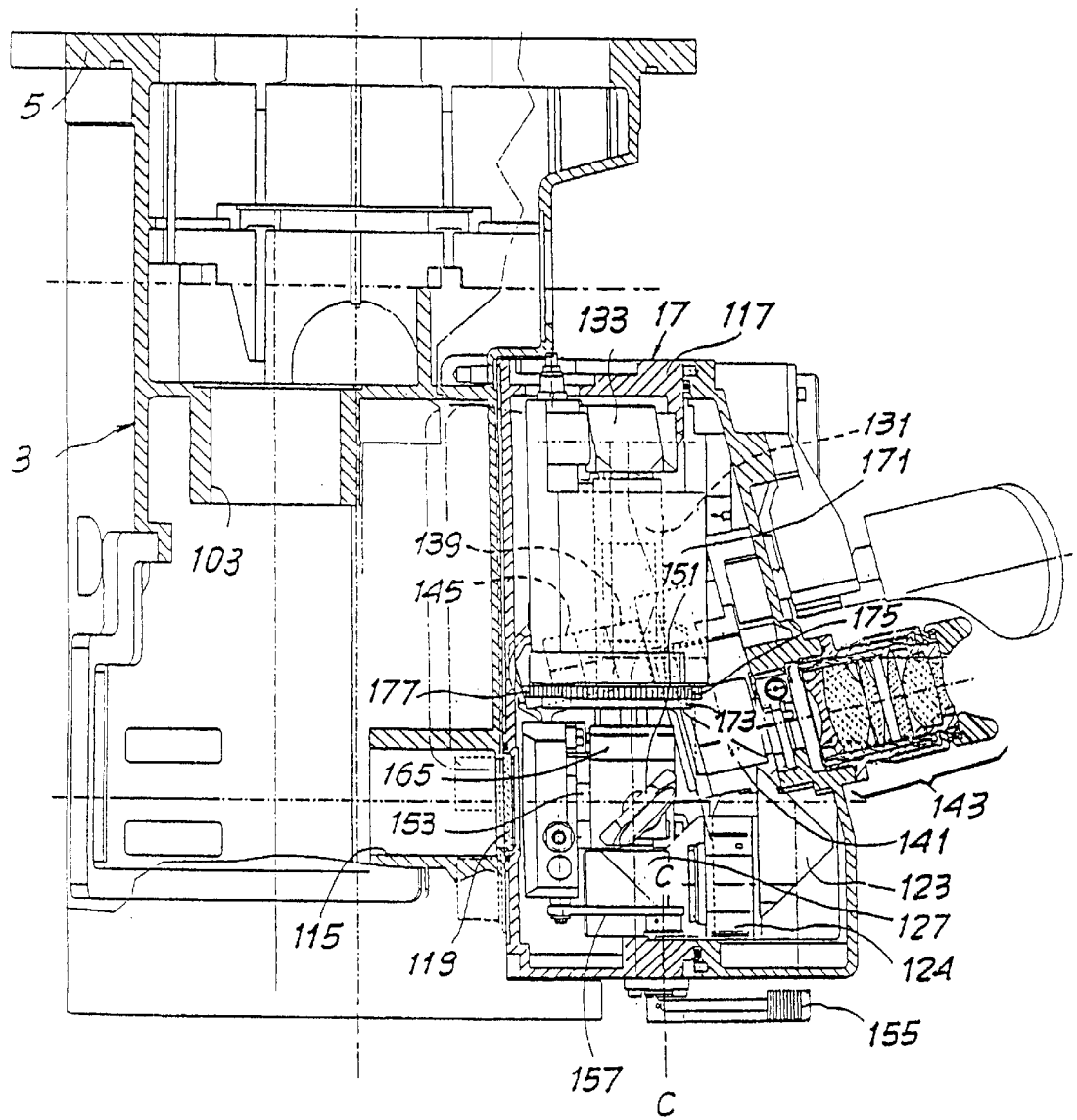
FIG. 7 shows a section through the viewing module.
Figure 10:
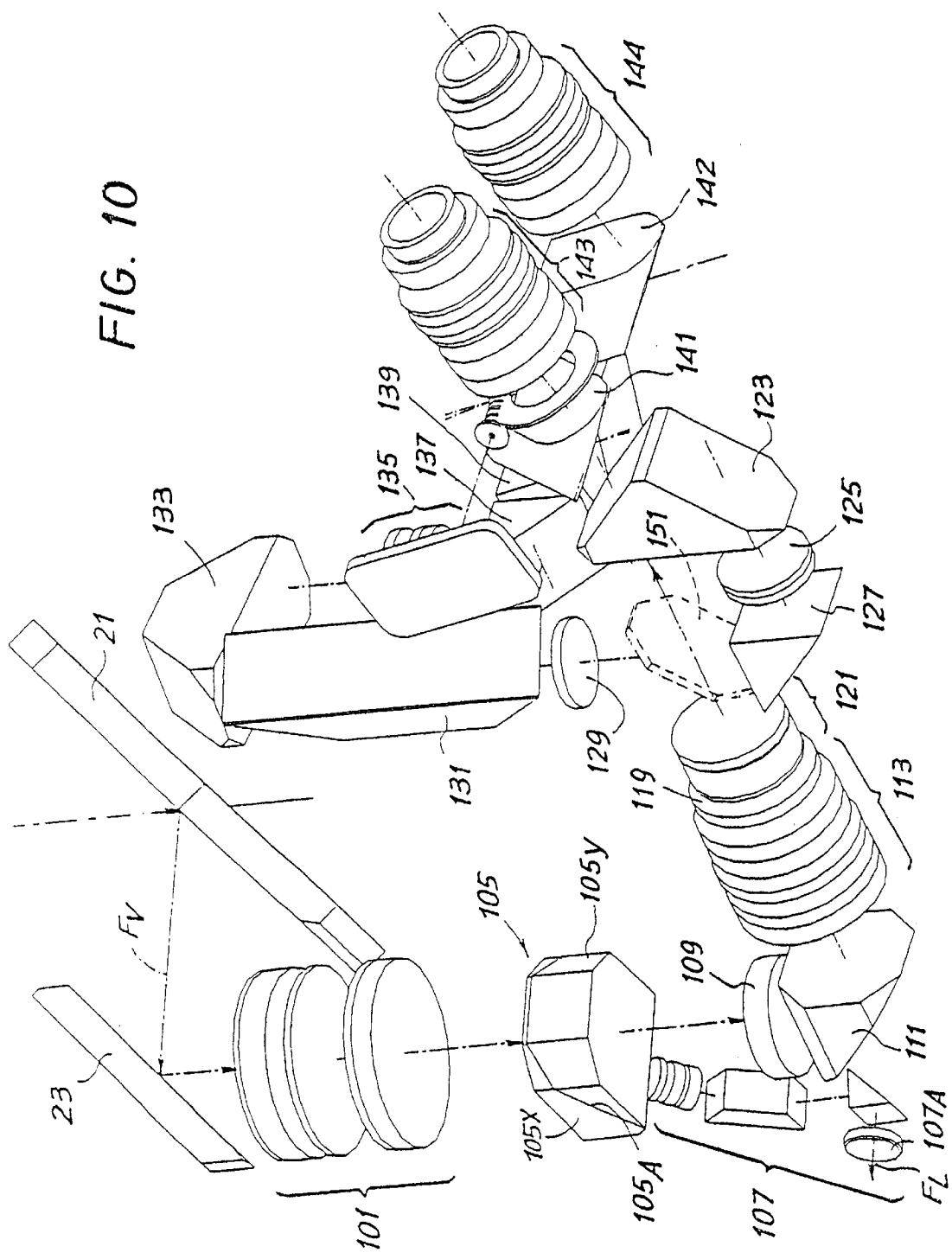

The visible beam which emerges from the surface 105U passes through a sighting grid 109 until it reaches a deviator prism 111 which modifies the path thereof, deviating it by 900. The beam which emerges from the prism 111 passes through a collimation optics group 113 housed in a seat 115 (FIG. 7) of the central body 3 of the device. The collimation optics 113 also serve as a window for closing the central body 3 on the side where the viewing module 17 is joined and from it a collimated beam emerges. The viewing module 17 is housed in a body 117 which has an entry window 119 (FIGS. 7, 10). The optical elements which will be described below are all contained in the viewing module 17, which is joined to the central body 3 of the device by means of flat support surfaces (visible in the local cross-section shown in FIG. 7). Since in this case also, as in the case of the infrared path, a collimated beam emerges from the central body 3, it is sufficient to ensure correct mutual angular positioning of the central body 3 and body 117, which can be obtained with flat reference surfaces, without the need for ensuring the coaxiality of the optics.

The viewing module 17 has arranged inside it optical elements which allow the visible beam to follow two alternative paths, corresponding to two different magnification ratios, which can be selected by the operator via a lever. The more complex path, shown in a particularly clear manner in FIG. 10, will be described below. The beam which enters into the viewing module 17 through the window 119 enters into a divergent optical group 121 from where it emerges so as to be deviated by a prism 123 towards a convergent optical element 125 housed in a seat 124 shown in FIG. 7. The beam emerging from the optics 125 is again deviated by a further prism 127 towards a filter 129 so as to reach a de-rotator prism 131, consisting of a so-called "Dove prism", known in the art. The mechanical assembly of the prism 131 will be described below with reference to FIG. 9.

The beam emerging from the de-rotator prism 131 is deviated through 180° by a deviator prism 133 so as to reach the focussing optics 135, visible in particular in FIG. 11 and forming the objective of viewing telescope. The focussed beam is deviated by a prism 137 and enters into a beam separator prism 139. The latter has an inner separating surface 139A (so-called "beam splitter") which divides the entry beam into two: 50% of the energy of the optical beam is deviated through a first lozenge prism 141 to a first eyepiece, while the remaining 50% of the energy of the beam passes through the surface 139A so as to be reflected by the rear face of the prism 139 towards a second lozenge prism 142 and -from here to a second eyepiece 144. The prisms 141, 142 and the respective eyepieces 143, 144 are mounted so as to be able to adjust the interaxial distance of the eyepieces 143, 144, by adapting it to the interpupillar distance of the operator observing the scene through the eyepieces 143, 144. Each eyepiece 143, 144 forms, together with the objective 135, a viewing telescope.

On the face of the beam separator prism 139 opposite to the face on which the prisms 141, 142 are joined there is arranged a further prism 145 through the entry face 145A of which the beam from a television micro-monitor is able to enter, said micro-monitor being known per se and the image obtained from the re-imager 81 being reproduced thereon. This image is deviated by the prism 145 towards the beam splitter prism 139, the separating surface 139A of which divides the beam into two parts which are sent to the two eyepieces 143, 144. Obviously, when the micro-monitor is in operation and the image which reaches the eyepieces 143, 144, and hence the observer, is the television image obtained from the infrared sensor, the visible optical path is interrupted by a diaphragm suitably positioned along the path itself and not shown.

In order to modify the magnification ratio of the image which can be observed through the eyepieces 143, 144, it is possible to insert a deviating mirror 151, indicated by dotted lines in FIGS. 10 and 11, along the optical path. When the mirror 151 is inserted into the position shown in broken lines in FIG. 10, the optics 121 is displaced with respect to the optical path, such that the collimated beam which passes through the window 119 reaches the objective 135 with a series of deviations without passing through the focussing optics.

Figure 8:
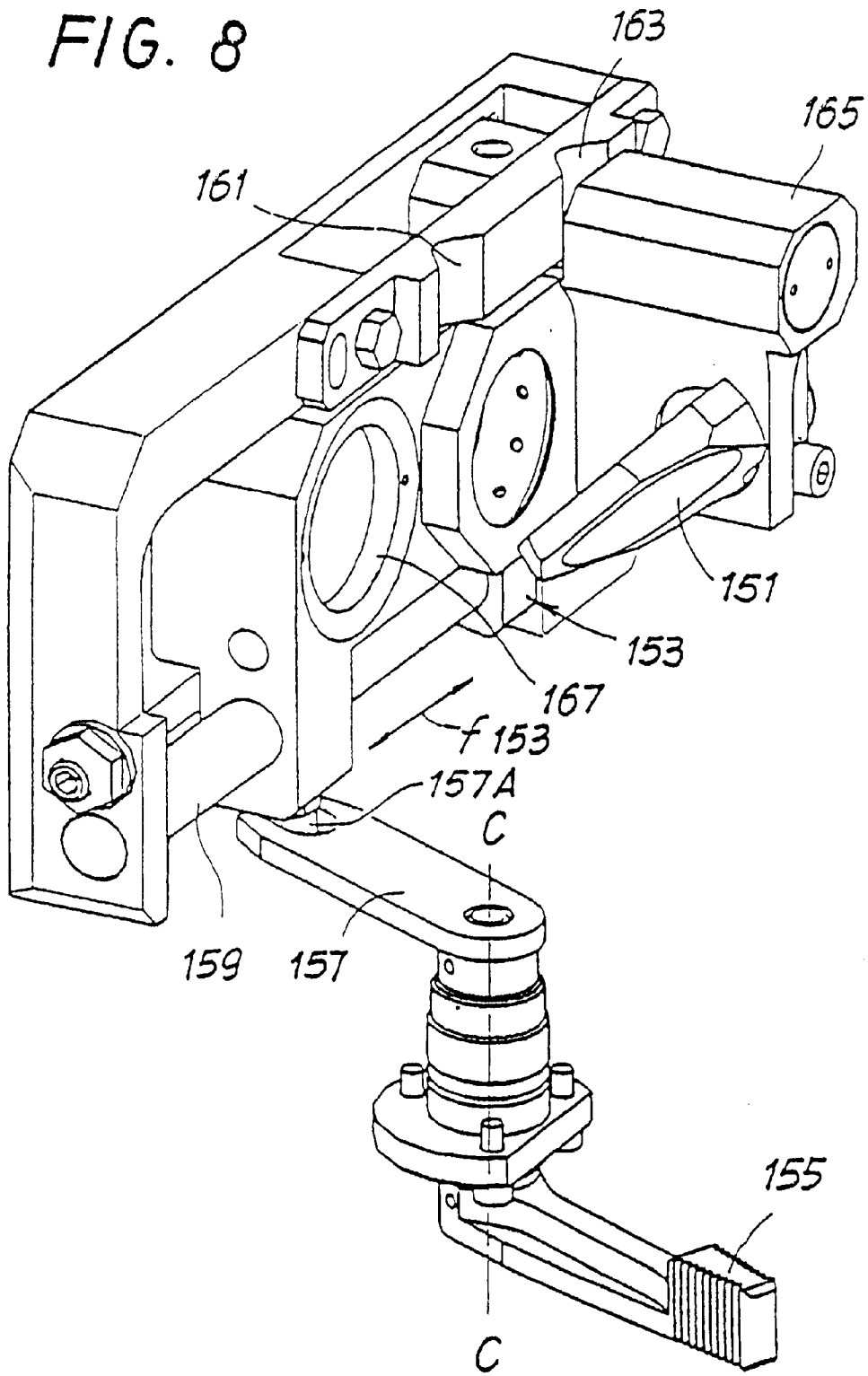
FIG. 8 shows an axonometric view of the magnification changing device in the viewing module.

In order to change the magnification ratio of the image which can be seen through the eyepieces 143, 144, it is therefore necessary to bring into the optical path alternately the negative optics 121 or the mirror 151. For this purpose these two elements are mounted on a carriage 153 designed to perform a translatory movement perpendicularly with respect to the plane of FIG. 7 by means of a lever 155. FIG. 8 shows an axonometric view of the carriage 153 in isolation from the other elements of the viewing module 17, for the sake of greater clarity.

The lever 155 is hinged about an axis C—C and causes displacement of the carriage 153 in the direction indicated by the double arrow f153 in FIG. 8 by means of a swing arm 157 provided with an eyelet 157A, in which a pin integral with the carriage 153 engages. The movement of the carriage 153 is guided by means of a guide 159 and the two positions which can be alternately assumed by the carriage 153 are defined by two notches 161, 163 into which a catch (not visible) is inserted, said catch being controlled by an electromagnet or other suitable actuator generally indicated by 165 and mounted on the carriage 153. In the position where the catch is engaged in the notch 163 (condition shown in FIG. 8), the mirror 151 is displaced with respect to the optical path of the visible beam, whereas in the position where the catch is engaged in the notch 161 the mirror is located in the path of the optical beam and deviates it towards the de-rotator prism 131.

The carriage 153 is provided with a seat 167 in which the optics 121 are mounted and can thus be brought into the optical path by way of an alternative to the mirror 151.

Figure 9:
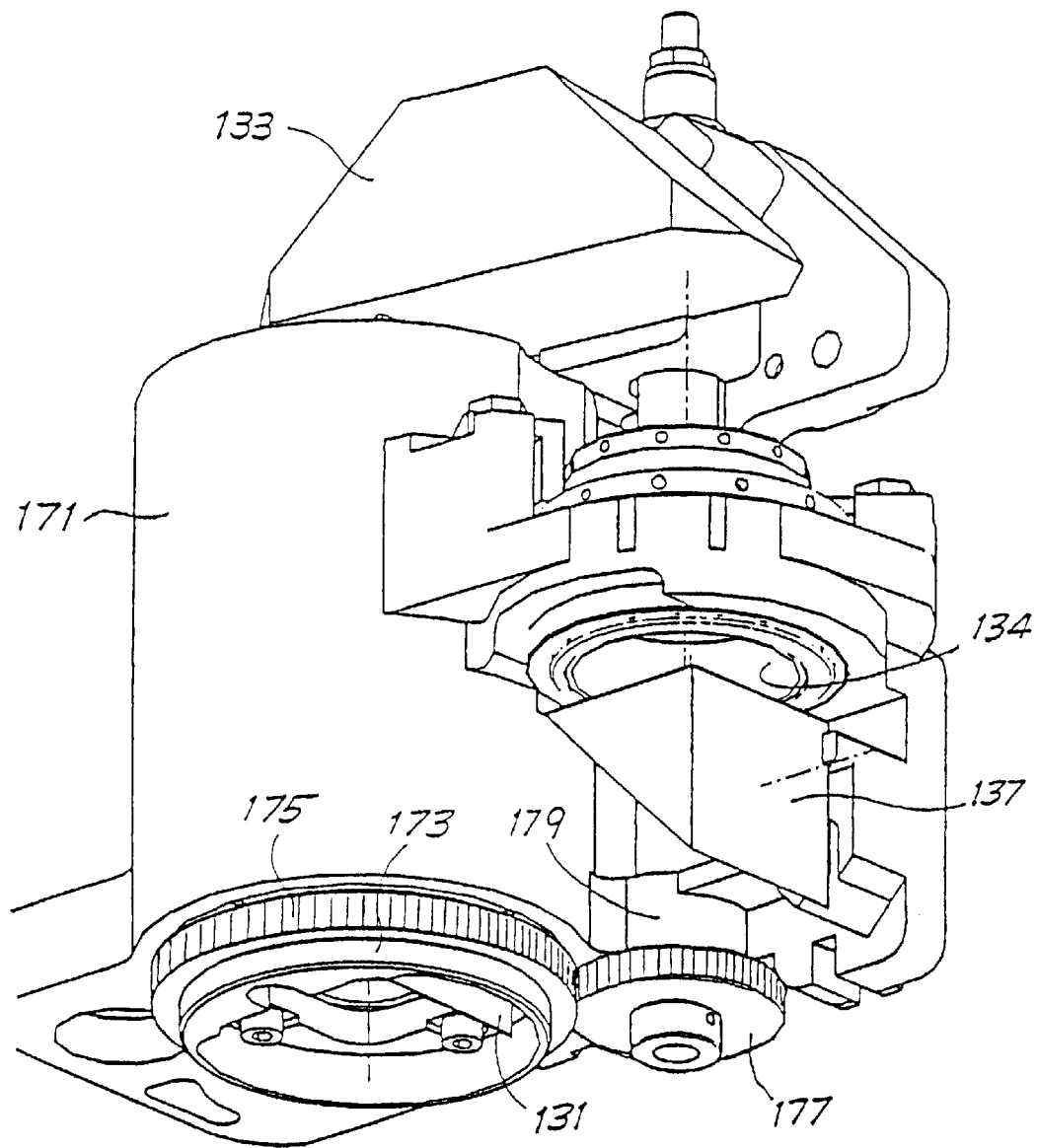
FIG. 9 shows an axonometric view of the de-rotator of the viewing module.

FIG. 9 shows an axonometric view of the de-rotator, of which the prism 131 forms a part. It has a fixed body 171 with, arranged inside it, a group rotating about a vertical axis, the bottom part 173 of which is visible and with which the prism 131 is integral. The rotating group 173 has integral with it a crown gear 175 which meshes with a pinion 177 actuated by a motor 179. The rotation of the de-rotator about the optical axis of the prism 131 is controlled in a similar manner and for the purposes already described with reference to the de-rotator 83 of the infrared module 15. FIG. 9 also shows the seat 134 in which the focussing objective 135 is mounted, as well as the deviating prisms 133 and 137.

Figure 12:
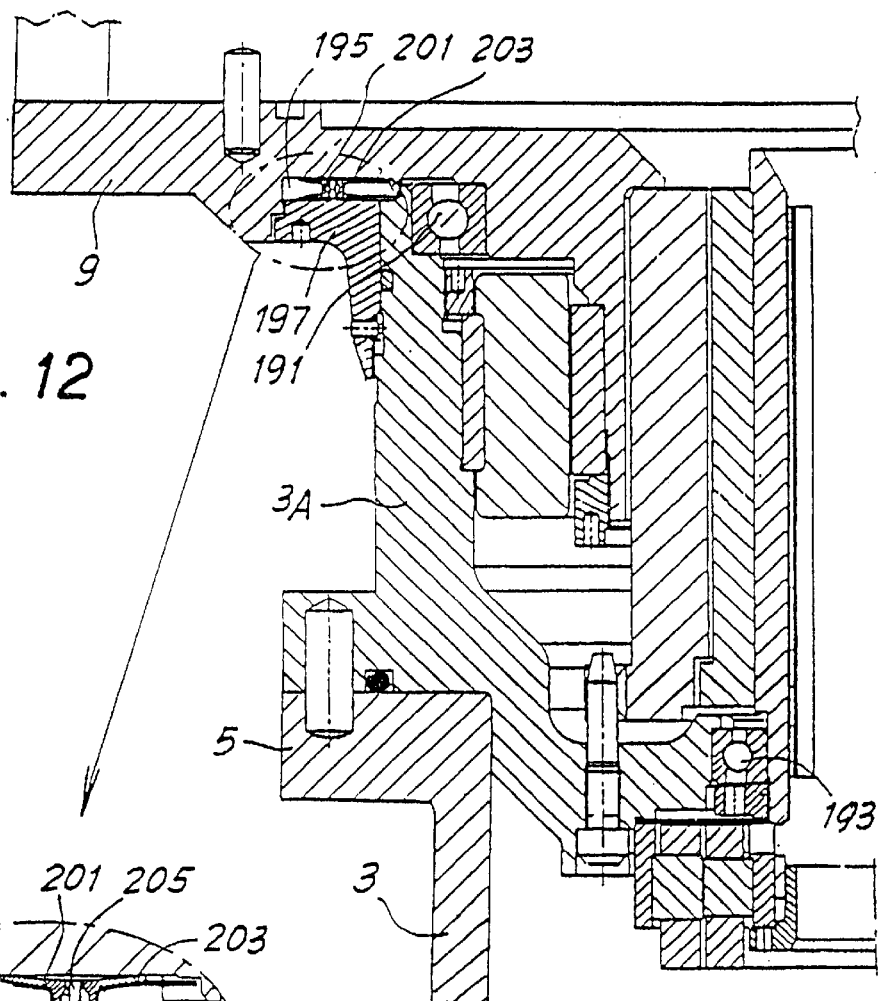
FIG. 12 shows a partial axial section through the zone for hinging between the head-piece and body of the device.
Figure 12A:
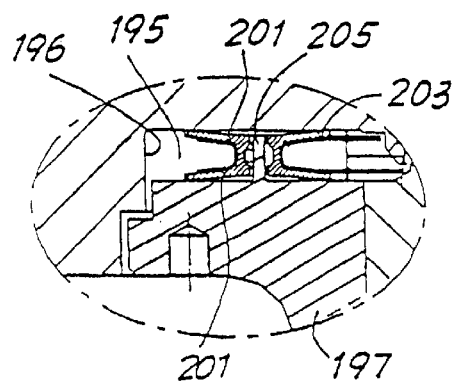
FIG. 12A shows a detail of FIG. 12 on a larger scale.

FIG. 12 shows a partial axial section through the zone for hinging of the rotating head-piece 9 and the intermediate element 3A of the central body 3. The head-piece 9 is supported via a pair of bearings 191, 193 on the intermediate element 3A.

In order to ensure the sealing action between the inside and the outside of the device 1, an annular seat 195 is provided, said seat being defined by an annular channel 196 formed in the base element of the head-piece 9 and by a ring 197 integral with the intermediate element 3A of the central body 3. The seat 195 has arranged in it two flat annular gaskets with a V-shaped section having an opposing sealing geometry. The first external annular gasket 201 ensures sealing against the pressure of external fluid (air), while the second internal annular gaskets 203 prevents the escape of gas under pressure contained inside the device 1. A cylindrical wall 205 integral with the ring 197 extends between the two gaskets 201, 203. The walls on which the gaskets slide have a controlled roughness.

This arrangement ensures on the one hand a perfect seal in both directions, i.e. form the outside towards the inside and from the inside towards the outside. On the other hand a sufficient reduction in the friction is guaranteed to ensure a limited resistance torque.

It is understood that the drawing merely shows an example provided solely by way of a practical demonstration of the invention, the forms and arrangements of said invention being able to be varied without departing from the scope of the idea underlying the invention itself. Any reference numbers present in the accompanying claims are merely intended to facilitate reading of the claims with reference to the description and drawing, and do not limit the scope of protection represented by the claims.

What is claimed is:

1. A panoramic periscope comprising:
   a body to be mounted on a vehicle with at least two optical paths arranged inside said body;
   a head-piece supported on said body and rotating with respect thereto and provided with a window for observing the external scenery;
   a mirror inside said head-piece for deflecting the incoming beam from said window towards detection means;
   said head-piece and said body being stably joined together with the intervening arrangement of a seal which isolates the inside of said head-piece and said body from the outside and allowing mutual rotation thereof, said seal comprises a pair of flat gaskets with opposing geometry, a first of said gaskets is designed to ensure sealing from the outside towards the inside and a second of said gaskets is designed to ensure sealing from the inside towards the outside.

2. Periscope according to claim 1, wherein:
   said gaskets have a V-shaped section.

3. A panoramic periscope comprising:
   a body to be mounted on a vehicle with at least two optical paths arranged inside said body;
   a head-piece supported on said body and rotating with respect thereto and provided with a window for observing the external scenery;
   a mirror inside said head-piece for deflecting the incoming beam from said window towards detection means;
   said head-piece and said body being stably joined together with the intervening arrangement of a seal which isolates the inside of said head-piece and said body from the outside and allowing mutual rotation thereof, said seal includes a plurality of gaskets arranged in an annular seat defined by a flat annular groove in said head-piece, and by a double annular groove in a ring integral with said body, surfaces on which said gaskets slide have a controlled roughness.

4. A panoramic periscope comprising:
   a body to be mounted on a vehicle with at least two optical paths arranged inside said body;
   a head-piece supported on said body and rotating with respect thereto and provided with a window for observing the external scenery;
   a mirror inside said head-piece for deflecting the incoming beam from said window towards detection means;
   said head-piece and said body being stably joined together with the intervening arrangement of a seal which isolates the inside of said head-piece and said body from the outside and allowing mutual rotation thereof;
   a viewing module associated with said body containing means for focusing a visible radiation beam coming from the head-piece and at least one eyepiece for observing external scenery, said viewing module being separatable from said body, said body and said viewing module having respective windows for exiting from the body and for entry into the viewing module, for passage of the beam.

5. Periscope according to claim 4, wherein:
   said body has arranged inside it an optical group which comprises an objective and collimation optics and forms a telescope for the visible radiation, said optical group having associated with it a sighting grid.

6. Periscope according to claim 4, characterized in that said body has arranged inside it collimation optics from which a collimated beam directed towards said viewing module emerges.

7. Periscope according to claim 6, wherein:
   said collimation optics form an exit window of said body.

8. Periscope according to claim 6, wherein;
   said viewing module and said body are joined together along two respective flat reference surfaces perpendicular to the optical axis of said collimation optics.

9. Periscope according to claim 5, wherein:
   the objective of the optical group forming the telescope for the visible radiation also constitutes an optical element for a laser beam of a telemeter.

* * * * *